(12) United States Patent
Meister et al.

(10) Patent No.: US 10,095,494 B2
(45) Date of Patent: Oct. 9, 2018

(54) SYSTEMS AND METHODS FOR FOOTPRINT BASED SCHEDULING

(71) Applicant: Reservoir Labs, Inc., New York, NY (US)

(72) Inventors: Benoit J. Meister, New York, NY (US); Muthu M. Baskaran, Bayonne, NJ (US); Richard A. Lethin, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 330 days.

(21) Appl. No.: 14/839,539

(22) Filed: Aug. 28, 2015

(65) Prior Publication Data
US 2016/0098257 A1   Apr. 7, 2016

Related U.S. Application Data

(60) Provisional application No. 62/043,142, filed on Aug. 28, 2014.

(51) Int. Cl.
*G06F 9/45* (2006.01)
*G06F 8/41* (2018.01)

(52) U.S. Cl.
CPC .......... *G06F 8/4441* (2013.01); *G06F 8/4434* (2013.01)

(58) Field of Classification Search
CPC ...... G06F 8/443; G06F 8/4434; G06F 8/4441; G06F 8/452
See application file for complete search history.

(56) References Cited

U.S. PATENT DOCUMENTS

| | | | | |
|---|---|---|---|---|
| 5,230,053 A | * | 7/1993 | Zaiki | G06F 8/452 717/150 |
| 6,757,892 B1 | * | 6/2004 | Gokhale | G06F 8/443 711/173 |
| 6,772,415 B1 | * | 8/2004 | Danckaert | G06F 8/452 712/241 |
| 8,087,011 B2 | * | 12/2011 | Eichenberger | G06F 8/452 717/150 |
| 8,572,590 B2 | * | 10/2013 | Lethin | G06F 8/452 717/143 |
| 8,661,422 B2 | * | 2/2014 | Lethin | G06F 12/023 717/151 |
| 8,930,926 B2 | * | 1/2015 | Bastoul | G06F 8/453 717/119 |
| 2010/0070956 A1 | * | 3/2010 | Leung | G06F 8/452 717/143 |
| 2010/0218196 A1 | * | 8/2010 | Leung | G06F 8/453 718/107 |
| 2016/0098257 A1 | * | 4/2016 | Meister | G06F 8/4441 717/161 |

* cited by examiner

*Primary Examiner* — Marina Lee
(74) *Attorney, Agent, or Firm* — Goodwin Procter LLP

(57) ABSTRACT

A system can generate and impose constraints on a compiler/scheduler so as to specifically minimize the footprints of one or more program variables. The constraints can be based on scopes of the variables and/or on dependence distances between statements specifying operations that use the one or more program variables.

36 Claims, 9 Drawing Sheets

```
void f1() {
  for (i=0; i< 1000; i++) {
    for (j =0; j< 1000; j++) {
      t = foo1 (i,j);                    // S1
      B[i][j] = t + foo2 (t, j);         // S2
      C[i][j] = foo3 (t, B[i][j]);       // S3
      /* Original scope of variable t is 2 */
    }
  }
}

/* fissioned loops */
void g1() {
  for (i=0; i< 1000; i++) {
    for (j =0; j< 1000; j++) {
      t[i][j] = foo1 (i,j);                       // S1
      B[i][j] = t[i][j] + foo2 (t[i][j], j);      // S2
    }
  }
  for (i=0; i< 1000; i++) {
    for (j =0; j< 1000; j++) {
      C[i][j] = foo3 (t[i][j], B[i][j]);          // S3
      /* New scope of variable t is 0 */
    }
  }
}
```

```
for (i = 0; i < 10 ; i++ ) {         // dim=1
  for (j = 0; j < 10 ; j++ ) {       // dim=2
    A[i][j] =  foo(i,j) ;            // definition of A
    for (k = 0 ; k < 10 ; k++ ) {    // dim=3
      B += A[i][j];                  // use of A (dim=3)
    }
    C[i][j] = A[i][j];               // use of A (dim=2)
  }
}
```

Listing 1: Scope of A

FIG. 1

```
for (i=0; i< 10; i++) {
  for (j=0; j <10; j++) {
    A[i][j] = f(i,j);
    C[i][j] = g(A[i][j]);
  }
}
for (k=0; k< 10; k++) {
  for (l=0; l <10; l++) {
    for (m =0; m< 10; m ++) {
      A[l][m+1] = C[l][m];
      x += h(A[l][m+1], m);
    }
  }
}
```

Listing 2: Absolute and relative scopes

FIG. 2

```
void f() {
  for (i=0; i< 1000; i++) {
    for (j =0; j< 1000; j++) {
      t = foo1 (i,j);
      B[i][j] = t + foo2 (t, j);
      C[i][j] = foo3 (t, B[i][j]);
    }
  }
}
/* fissioned loops */
void g() {
  for (i=0; i< 1000; i++) {                    // Loop nest 1
    for (j =0; j< 1000; j++) {
      t[i][j] = foo1 (i,j);
      B[i][j] = t[i][j] + foo2 (t[i][j], j);
    }
  }
  for (i=0; i< 1000; i++) {                    // Loop nest 2
    for (j =0; j< 1000; j++) {
      C[i][j] = foo3 (t[i][j], B[i][j]);
    }
  }
}
```

Listing 3: Degrading locality and footprint by loop fission

FIG. 3

```
void f(A, y) {
  for (i =0; i< 1000; i++) {
    x[i][j] = 0;
  }
  for (i =0; i< 1000; i++) {
    for (j=0; j< 1000; j++) {
      t = foo1 (A[i][j ]);
      x[i][j] = t + i;
    }
  }
  for (i =0; i< 1000; i++) {
    for (j=0; j< 1000; j++) {
      y[i][j] = foo2 (A[i][j]);
    }
  }
}
void g(A, y) {
  for (i =0; i< 1000; i++) {
    x[i][j] = 0;
  }
  for (i =0; i< 1000; i++) {
    for (j=0; j< 1000; j++) {
      t[i][j] = foo1 (A[i,j]);
      y[i][j] = foo2 (A[i,j]);
    }
  }
  for (i =0; i< 1000; i++) {
    for (j=0; j< 1000; j++) {
      x[i][j] = t[i][j] + i;
    }
  }
}
```

Listing 4: A difference in footprint

FIG. 4

```
void f1() {
  for (i=0; i< 1000; i++) {
    for (j =0; j< 1000; j++) {
      t = foo1 (i,j);                        // S1
      B[i][j] = t + foo2 (t, j);             // S2
      C[i][j] = foo3 (t, B[i][j]);           // S3
      /* Original scope of variable t is 2 */
    }
  }
}

/* fissioned loops */
void g1() {
  for (i=0; i< 1000; i++) {
    for (j =0; j< 1000; j++) {
      t[i][j] = foo1 (i,j);                  // S1
      B[i][j] = t[i][j] + foo2 (t[i][j], j); // S2
    }
  }
  for (i=0; i< 1000; i++) {
    for (j =0; j< 1000; j++) {
      C[i][j] = foo3 (t[i][j], B[i][j]);     // S3
      /* New scope of variable t is 0 */
    }
  }
}
```

FIG. 5A

```
void f2() {
  for (i=0; i< 1000; i++) {
    for (j =0; j< 1000; j++) {
      t = foo1 (i,j);                         // S1
      B[i][j] = t + foo2 (t, j);              // S2
      /* Original scope of variable t is 2 */
      for (k =0; k< 10; k++) {
        C[i][j][k] = foo4 (B[i][j], k);       // S4
      }
    }
  }
}

/* fissioned loops */
void g2() {
  for (i=0; i< 1000; i++) {
    for (j =0; j< 1000; j++) {
      t = foo1 (i,j);                         // S1
      B[i][j] = t + foo2 (t, j);              // S2
    }
  }
  for (i=0; i< 1000; i++) {
    for (j =0; j< 1000; j++) {
      for (k =0; k< 10; k++) {
        C[i][j][k] = foo4 (B[i][j], k);       // S4
      }
    }
  }
}
/* New scope of variable t is still 2 */
```

FIG. 5B

```
void f() {
  for (i=0; i< 1000; i++) {
    for (j =0; j< 1000; j++) {
      t = foo1 (i,j);                  // S1
      B[i][j] = t + foo2 (t, j);       // S2
      C[i][j] = foo3 (t, B[i][j]);     // S3
    }
  }
}
```

FIG. 6

```
for (l=0; l< 10; l++) {
  for (m=0; m < 1000; m +=2) {
    for (n=0; n < 100; n++) {
      for (i=0; i< 10; i++) {
        for (j=0; j <10; j++) {
          A[i][j] = foo(j, j);
          for (k=0; k< 10; k++) {
            B+= A[i][j];
          }
          C[i][j] = A[i][j];
        }
      }
    }
  }
}

/* The original scope of variable A is 5 */ for (l=0; l< 10; l++) {                    // dim=1; cost=40
  for (m=0; m < 1000; m +=2) {             // dim=2; cost=30
    for (n=0; n < 100; n++) {              // dim=3; cost=20
      for (i=0; i< 10; i++) {              // dim=4; cost=10
        for (j=0; j <10; j++) {            // dim=5; cost=0
          A[i][j] = foo(j, j);
          for (k=0; k< 10; k++) {          // dim=6; cost=0
            B+= A[i][j];
          }
          C[i][j] = A[i][j];
        }
      }
    }
  }
}
```

FIG. 7A

```
for (l=0; l< 10; l++) {
  for (m=0; m < 1000; m +=2) {
    for (n=0; n < 100; n++) {
      for (i=0; i< 10; i++) {
        for (j=0; j <10; j++) {
          A[i][j] = foo(j, j);      // S1
          for (k=0; k< 10; k++) {
            B+= A[i][j];            // S2
          }
          C[i][j] = A[i][j];        // S3
        }
      }
    }
  }
}

/* The original scope of variable A is 5 */
/* The dependence distance between S1 and S2 is δ_{1,2} */
for (l=0; l< 10; l++) {                   // dim=1; δ_{1,2}=0
  for (m=0; m < 1000; m +=2) {            // dim=2; δ_{1,2}=1
    for (n=0; n < 100; n++) {             // dim=3; δ_{1,2}=2
      for (i=0; i< 10; i++) {             // dim=4; δ_{1,2}=3
        for (j=0; j <10; j++) {           // dim=5; δ_{1,2}=4
          A[i][j] = foo(j, j);
          for (k=0; k< 10; k++) {         // dim=6;
            B+= A[i][j];
          }
          C[i][j] = A[i][j];
        }
      }
    }
  }
}
```

FIG. 7B

```
f()
   for (i = 0; i < 10 ; i++ )   {
     for (j = 0; j < 10 ; j++ )   {
       A[i][j] =  foo(i,j);
       for (k = 0 ; k < 10; k++ )   {
         B[k] = foo2(k) + A[i][j];
       }
     }
   }
} g()
   for (i = 0; i < 10 ; i++ )   {
     for (j = 0; j < 10 ; j++ )   {
       for (k = 0 ; k < 10; k++ )   {
         SA =  foo(i,j);
         B[k] = foo2(k) + SA;
       }
     }
   }
}
```

FIG. 8

SYSTEMS AND METHODS FOR FOOTPRINT BASED SCHEDULING

CROSS-REFERENCE TO RELATED APPLICATIONS

This application claims priority to and benefit of U.S. Provisional Patent Application No. 62/043,142, entitled "System, Method and Apparatus for Footprint-Conscious Scheduling," filed on Aug. 28, 2014, the entire contents of which are incorporated herein by reference.

GOVERNMENT LICENSE RIGHTS

This invention was made with Government support under contract numbers FA8750-12-C-0146 and FA8750-13-C-0164 awarded by the United States Air Force. The Government has certain rights in the invention.

FIEND OF THE INVENTION

This disclosure generally relates to compilers and, in particular, to compilers that can optimize both performance and memory usage.

BACKGROUND

Compilers, in general, translate human-readable code (typically called source code or programs) into machine-readable code that is executable on a target computing system or code that can be further transformed into executable code. During this translation, many modern compilers perform one or more optimizations that enhance the performance of the executable code as it is executed (also called run) on a target computing system. Performance improvement may include one or more of increasing speed of execution, minimizing, maximizing, or optimizing the consumption of available computing resources of the target computing system such as the number of processors in a multi-processor computing system, memory size, bandwidth, and/or latency, power consumption, etc.

Generally, an important aspect of such compiler optimizations is scheduling the operations of the program such that semantic integrity of the program is maintained, i.e., the logical behavior of the program as expressed by the programmer/software developer is not altered, while scheduling the operations for high-speed execution without violating other specified constraints on the usage of available computing resources. This task, often called scheduling, is performed by the compiler or by a component thereof called a scheduler. The schedulers in many modern compilers can schedule operations for execution by a single processor, by several threads of a single processor, or by two or more processors executing in parallel. The compiler/scheduler may therefore perform one or more transform that can parallelize the code. Alternatively, or in addition, the compiler/scheduler can transform the code to optimize temporal and/or spatial locality of data, communication between memory hierarchies (e.g., between a global memory and a private or shared memory of a processor, between shared memories of different processors, etc.), power consumption, etc. Examples of such transforms include loop fusion, loop permutation, loop fission, tiling, etc.

During the course of performing such program transformations, the compiler/scheduler may perform variable expansion, also known as array expansion. Due to variable expansion, the memory requirement of a program variable or a data structure can increase by one or more orders of magnitude, e.g., from a few bytes to tens, hundreds, or even millions of bytes. In some cases, the required memory exceeds the available memory, making the execution of the program on the target computing system infeasible. To prevent this, some compilers/schedulers optimize the overall memory usage of the program during compilation/scheduling. Additionally or in the alternative, some compilers/schedulers perform array compression/contraction, that can decrease the overall memory usage. U.S. Pat. No. 8,572,595 to Lethin et al., entitled "Methods and Apparatus for Aggressive Scheduling in Source Code Compilation," the entire contents of which are incorporated herein by reference, describes schedulers that can optimize overall memory usage. These techniques, however, do not specifically take into consideration the particular memory requirements of one or more program variables as one or more program transformations are explored. This can lead to implementation of schedules that are inefficient or infeasible in terms of memory usage.

SUMMARY

In various embodiments, systems and methods described herein facilitate compilation of a program and scheduling of operations therein where the scheduling specifically constrained by a constraint corresponding to a footprint of a variable used by the operations. Typically, the operations are programmed within a loop nest and the footprint may be related to the original scope of the variable. The constraint may preserve the original scope as the scheduler transforms the program for optimization thereof, and preservation of the scope can minimize or prevent expansion of the footprint. Alternatively, the footprint may be related to various dependence distances between various pairs of program statements specifying operations using the variable. Constraining and/or minimizing the dependence distances can also minimize or prevent expansion of the footprint. As opposed to optimizing overall memory usage, which may have on indirect effect on the footprint of a variable, these techniques directly account for the footprints of one or more program variables. This can increase the efficiency of the compiler/scheduler in producing a feasible schedule, and may also lead to discovery of efficient schedules that would not be explored without the use of footprint-specific constraints described herein.

Accordingly, in one aspect, a method is provided for controlling scheduling of statements of a program for execution by a computing apparatus. The method includes performing by a processor the steps of identifying several statements within a loop nest, where the statements represent operations using a variable. The method also includes setting a constraint corresponding to a footprint of the variable for a scheduler for scheduling the loop nest for execution by the computing apparatus.

In some embodiments, setting the constraint includes determining an original scope of the variable within the loop nest, where the original scope is a maximum depth of the loop nest at which all the values produced and stored in the variable at a given iteration of the nested loops are also fully consumed by all its consumers at the same iteration, and the maximum depth is not greater than the depth at which one or more values are assigned to the variable. In these embodiments, the constraint is associated with the original scope. Alternatively, or in addition, setting the constraint may include receiving from the scheduler a loop fission transform which distributes the loop nest into a first sub nest and a second sub nest, and determining by the processor a new scope of the variable corresponding to the first and second loop nests. Setting the constraint may further include permitting the scheduler to perform fission transform if the new scope is equal to the original scope, and otherwise configuring the scheduler to reject the loop fission transform.

In some embodiments, setting the constraint includes identifying several statements each of which represents an operation using the variable, and setting a dependence distance between all pairs of the various statements to zero. Setting the constraint may also include setting a designated zero penalty for a base loop dimension that is equal to the original scope. In addition, the method may include, for each of loop dimension from previous to the base loop dimension up to dimension of the outermost loop of the loop nest, setting a penalty that is greater than the designated zero penalty and that is a function of the loop dimension. The penalty may include a cost, and the scheduler may reject any transform if cost of the transform is greater than the cost. Setting the designated zero penalty may include setting the cost to zero, and setting the penalty that is a function of the loop dimension may include setting a cost value that increases as the loop dimension decreases.

In some embodiments, the penalty includes a permissible dependence distance between a pair of statements, where each statement represents an operation using the variable. Setting the designated zero penalty may include setting the permissible dependence distance to a maximum permissible distance, and setting the penalty that is a function of the loop dimension may include setting a permissible dependence distance that decreases as the loop dimension decreases. The method may further include computing by the processor the maximum dependence distance.

In some embodiments, setting the constraint includes computing for each one of a number of statement pairs, each statement in each pair representing an operation using the variable, a respective set of dependence distances. The method may also include determining a maximum of the several dependence distances in the set, and associating a cost proportional to the maximum dependence distance. The cost may further correspond to a number of iterations associated with the variable for a loop dimension to be scheduled. In some embodiments, the method includes configuring the scheduler to minimize the maximum dependence distance. The method may further include increasing the original scope of the variable by transforming the loop nest.

In another aspect, a system for customizing a scheduler for controlling scheduling of statements of a program for execution by a computing apparatus includes a first processor and a first memory in electrical communication with the first processor. The first memory includes instructions which, when executed by a processing unit that may include the first processor and/or a second processor and that is coupled to a memory module including either the first memory or a second memory, or both, program the processing unit to identify several statements within a loop nest, where the statements represent operations using a variable. The processing unit is also programmed to set a constraint corresponding to a footprint of the variable for a scheduler for scheduling the loop nest for execution by the computing apparatus. In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory module, to customize a scheduler. The instructions program the processing unit to identify several statements within a loop nest, where the statements represent operations using a variable. The processing unit is also programmed to set a constraint corresponding to a footprint of the variable for a scheduler for scheduling the loop nest for execution by the computing apparatus. In various embodiments, the instructions can program the processing unit to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which:

FIG. 1 illustrates the scope of a variable according to one code example;

FIG. 2 illustrates absolute and relative scopes of a variable according to another code example;

FIG. 3 shows a code example illustrating a relationship between variable footprint and variable scope;

FIG. 4 shows another code example illustrating a relationship between variable footprint and variable scope;

FIGS. 5A and 5B illustrate the use of a scheduling constraint based on variable scope, according to one embodiment;

FIG. 6 illustrates the use of another scheduling constraint for minimizing footprint increase, according to one embodiment;

FIG. 7A illustrates an adjustable constraint for minimizing footprint increase, according to one embodiment;

FIG. 7B illustrates another adjustable constraint for minimizing footprint increase, according to one embodiment; and FIG. 8 illustrates the effect of scheduler increasing the scope of a variable, according to one embodiment.

DETAILED DESCRIPTION

The "scope" of a program variable A (e.g., a data structure such as an array), if an element of A is defined within the nested loops, can be described as the maximum depth of the nested loops at which all the values produced and stored in A at a given iteration of the nested loops are also fully consumed by all its consumers at the same iteration, where the scope is not greater than the depth at which one or more values are assigned to the variable. In general, if one or more values assigned to a variable are consumed at a schedule/loop dimension p, it is considered that those values are also consumed at lower depths of the loop nest, i.e., at schedule/loop dimensions 1 through (p−1). In general, a first set of values assigned to the variable A may be consumed at a loop dimension q, where q>p. A second set of values assigned to the variable A, where the second set of values can be the same as or different from the first set of values, may be consumed at the loop dimension p, where p<q. Thus, the values of the variable A are not fully consumed at the loop depth q. If there are no statements in the loop nest at depths 1 through (p−1) that consume any of the values of the variable A, it is said that the values of the variable A are fully consumed at the loop depth p. According to the definition above, the values of the variable A are considered to have been consumed at loop depths 1 through p, as well. The depth p, however, is the maximum depth at which the values are fully consumed. While at least some if not all values of the variable A are also consumed at the greater depth q, as described above, the values are not fully consumed at the depth q. Because p is the maximum depth at which the values are fully consumed, the scope of the variable A is p.

To illustrate, with reference to FIG. 1, the depth of the outermost loop of the loop nest (i, j, k) in Listing 1, i.e., the loop i, is 1. The variable A is defined, i.e., values are assigned thereto, in loop (i, j), at depth/dimension 2. These values are used within loops (i j, k), at the depth/dimension 3. The values are not fully consumed at the depth 3, however, because these values are also used within the loop (i, j) at depth/dimension 2. Thus, the values of A are fully consumed at the depth/dimension 2. Per the definition above, these values are also considered to be consumed within the outermost loop at depth 1, but the maximum depth at which the values are fully consumed is 2 and, hence, the scope of the variable A in Listing 1 is 2.

In loop nests, the notion of scope is relative to a "base" loop, i.e., the loop within which the scope is analyzed. For convenience, the code block that contains all the loops may be referred to as the "root loop," although such code block may not necessarily be a loop or a loop body. The absolute scope of a data structure is expressed within the root loop. For example, the scope of A in Listing 2 shown in FIG. 2 is 2 within the loop nest (i, j) and is 3 with the loop nest (i, j, k).

Scope-Preserving Scheduling

Deep scopes can be very desirable because they generally imply one or more of the three following properties:

1. More locality. The deeper the scope, the closer the consumers are from the producers of a data. The scope of a variable (also called a data structure) typically determines the number of leading zeros in all its reuse vectors.

2. More parallelism. Since every element produced within the scope of a data structure is consumed within the same loop iteration, the loops that form the scope do not carry any dependences based on the data structure. As such, computing variable scopes can simplify dependence analysis, because it is known to the scheduler that there is no true (read-after-write) dependence outside the loops that form the scope. For example, with reference to FIG. 3, in the function f( ) the scope of variable t is 2, and the j loop can be parallelized by privatizing x or by making duplicates thereof. If N processors are available, where N is less than the total number of iterations of the loop nest (i, j) of 1,000×1,000, e.g., if the number of processors N is 2, 6, 8, 24, 32, 100, or any other number less than one million, only N duplicates of the variable x are needed for parallelization, and the footprint of x need not increase to a one million, as would be necessary in the case of fission as shown in function g( ). The number of duplicates can be determined at compile time by the compiler/scheduler and/or at runtime 3. Smaller footprints. Since the liveness of every element of a data structure is contained within its scope, the number of storage elements required to store generally equals the number of distinct elements produced within the scope.

Listing 3 of FIG. 3 shows two semantically equivalent functions f( ) and g( ), in which the best achievable footprints of the variable t are significantly different. The function g( ) can be obtained from f( ) by the process of loop fission, also called loop distribution.

In f( ), the scope of t is two, and it is zero in g( ) because the variable t is produced or defined in the Loop Nest 1 and is consumed or used in the Loop Nest 2. As such, in the function g( ) the variable t is live at the root loop and, hence, the scope of variable t in the function g( ) is zero. As a consequence of the loop fission, expansion oft into a (1000× 1000) array is necessary, resulting in an increase of the global footprint by close to a million elements.

A decrease in the scope of a variable typically results in the requirement to expand the data structure along the loops that formed the original scope and that are within the new scope. In Listing 3, this would include loop i and j.

Another example, which illustrates the impact of considering scopes in scheduling, is presented in Listing 4 of FIG. 4. In this example, the codes in functions f( ) and g( ) are equivalent in terms of parallelism and in the dependence distances obtained among the accesses to the different data structures x, t, and y. However, the scope oft is 2 in f( ) and lower (0) in g( ), hence the footprint oft is much greater in the function g(0). This is because the decrease of 2 in the scope requires an expansion oft along two loop dimensions, i and j.

A limitation of existing scheduling techniques is that, while they take into account several aspects such as parallelism, temporal and spatial locality, they do not explicitly incorporate footprint considerations. Unfortunately, an increase in footprint generally results in higher pressure on memory at best, and in the impossibility of allocating memory at worst. In various embodiments, to minimize or to prevent such a footprint blow-up, the loss of scope for the variables accessed in one or more loop nests is minimized. This additional constraint was added to several different schedulers, and was found to be compatible with the search for trade-offs among various other properties including parallelism, temporal locality, and spatial locality.

In the context of polyhedral scheduling, where schedule dimensions and fusion/fission characteristics are defined from the outermost loop of a loop nest to the innermost loop, constraints can be added to each search for a schedule dimension. In the scope for the data structures accessed in a loop nest in the original program is first computed. This scope is called the original scope. One or more scheduling constraints are derived using the original scope and are used during scheduling. In particular, a scheduling transform that the scheduler may have applied without scope-based constraint, is avoided due to the scope-based constraint, thereby preventing or minimizing the need for array expansion and resulting increase in memory footprint of the original program.

With refs to FIGS. 6A and 6B, in one embodiment the fission of statements accessing a data structure is prevented if the schedule dimension at which fission is applied is less than or equal to the scope of the data structure. For example, with reference to FIG. 5A, the original scope of variable t is 2 and after fission of statement S3 at loop dimension 2 which is not greater than the original scope of t, is performed, the new scope oft becomes zero. Therefore, such a fission is not permitted. On the other hand, with reference to FIG. 5B, after the fission of statement S4 at loop dimension 3, which is greater than the original scope of t (which again is 2), is performed, the new scope of t remains 2. Therefore, this fission is permitted. In scheduling the code of FIG. 5A, while fission of function f1( ) is not permitted, the corresponding instances of statements S1, S2 and S3 may be scheduled for different iterations of the loops of the loop nest. As such, prevention of array expansion in connection with a variable is not guaranteed, though it may be avoided.

In another embodiment, the dependence distance between statements accessing a data structure to be zero is alternatively or additionally forced if the schedule dimension is less than or equal to the scope of the accessed data structure. With reference to FIG. 6, the dependence distance between statement pairs S1, S2 and S2, S3 is set to be zero. Therefore, the scheduler schedules the corresponding instances of the statements S1, S2 and S3 in a single iteration. For example, "t=foo1(4, 203);" "B[4] [203]=t+foo2 (t, 203);" and "C[4] [203]=foo3 (t, B[4] [203]);" i.e., the instances of S1, S2, and S3 corresponding to (i, j)=(4, 203) are all scheduled in a single iteration. This can ensure that the variable t need not be expanded, thus guaranteeing that footprint expansion due to variable t is prevented.

A more flexible strategy is to assign a decreasing cost to fission and/or increasing the dependence distance as the depth of the schedule dimension increases, and up to the scope of the accessed data structure. With reference to FIG. 7A, the original scope of the variable A is 5. Therefore, for schedule dimensions 5 and 6 (corresponding to loops j and k, respectively) a penalty/cost to fission transform of zero is assigned. For the first loop dimension corresponding to the outermost loop 1 of the loop next, a penalty/cost=40 is assigned. The penalty/cost decreases from loop dimension 1 up to loop dimension 5, which is the original scope of the variable A. The decrease can be according to a preset amount, or it can be according to a function such as a linear or a non-linear (e.g., quadratic, geometric, exponential, logarithmic) function. Alternatively, or in addition, with reference to FIG. 7B the dependence distance between the pair of statements S1 and S2, denoted $\delta_{1,2}$, is set to zero for the outermost loop dimension 1. For the successive loop dimensions, the distance $\delta_{1,2}$ is increased up to a maximum value 4 for the loop dimension 5, which is the same as the original scope of the variable A. Additionally, or alternatively, the dependence distance for each schedule dimension can be set for the pair of statements S1 and S3 and/or the pair of statements S2 and S3. In general, the dependence distance may be set for one or more pairs of statements of the loop nest that access the variable of which the expansion is to be minimized or avoided.

In general, a penalty is decreased from loop dimension 1 up to the loop dimension that is the same as the scope of the variable. If the penalty is a cost, decreasing the penalty is equivalent to decreasing the cost. If the penalty is the dependence distance, decreasing the penalty is equivalent to increasing the dependence distance. The penalty can include a combination of cost and dependence distance.

An effect of this penalty is that a small loss of scope may be permitted to implement a schedule that may enhance other properties (e.g., parallelism, locality, communication of data between hierarchies of memory, etc.) while the corresponding array expansion needs are limited to a small number of dimensions. This enables a scheduler to optimize the overall performance while avoiding, minimizing, or limiting memory footprint blow up.

Footprint-Based Scheduling Heuristics

Yet another embodiment facilitates increasing the scope of a variable as compared to the original program. Scopes are a powerful and convenient concept, since they relate a number of loop dimensions with the required expansion of arrays. The expansions along the loop dimensions, are a particular, simpler case. Array expansions, however, can occur in a complex data flow, such as those that occur across different iterations of a particular set of loop dimensions.

In order to minimize or prevent array expansion caused by a complex data flow, a general formulation of footprint-based scheduling constraints is described. These general constraints, however, may be applied to various other schedulers. These constraints are described herein in the context of affine scheduling in the polyhedral model of loops. These general constraints, however, may be applied to various other schedulers.

Affine scheduling relies on a search in the set of legal combined schedules of a set of statements. The statements are mapped to a common schedule space, which, for the sake of convenience, can be seen as a time dimension. Additional variables and constraints are usually added to this space, such as variables representing upper bounds on the difference between the schedule (i.e., the time stamp) of two objects (e.g., statement instances, statements, loop nests, etc.). For example, a set of variables $\delta s, t$ may represent an upper bound on the difference between the schedules of statements s and t:

$$\phi t - \phi s = \delta_{s,t}$$

In one embodiment, to perform footprint-based scheduling, a constraint variable is introduced for each data structure (a variable, in general). The constraint variable represents the maximum dependence distance (i.e., the maximum $\delta$) for all dependences due to accesses to the data structure (also called an array). These constraint variables are called "footprint variables." When ignoring false and read-after-read dependences, these variables can represent the liveness of the values associated with an array. This results in constraints in the form:

$$\delta_{1,2} \leq n_A, \delta_{2,4} \leq n_A, \ldots$$

$$\delta_{3,2} \leq n_B, \delta_{1,2} \leq n_B, \ldots,$$

where $n_A$ is the maximum dependence distance among all statements of the loop nest accessing the array A, and $n_B$ is the maximum dependence distance among all statements of the loop next accessing the array B. The footprint-based constraint associates a cost with each footprint variable. Therefore, minimization of the footprint variable can minimize the associated cost. Minimization of the value of the respective footprint constraint variables also limits the respective array footprints resulting from expansion of the respective arrays.

In some embodiments, the costs associated with the footprint variable can be weighted such that relatively more importance is given to arrays accessed by a greater number of iterations, because the expansion of such arrays can create larger arrays than those created by the expansion of arrays accessed by a relatively fewer number of iterations. Such importance may translate into higher coefficients in the objective function associated with these, or with a higher rank among the footprint variables the scheduler may consider at any given point during scheduling. Arrays which already have several dimensions and need to maintain these dimensions for external reasons (for instance, they can be a parameter of a function to be optimized, and the scheduler is unaware of any other uses of the array) may optionally be given less importance.

In some embodiments, the footprint-based constraint, which requires minimization of a cost represented by the footprint variable, permits the scheduler to increase the scope of one or more variables. This can allow conversion of an array into a scalar, reducing the footprint of the associated variable by one or more orders of magnitude. Scheduling transforms that may permit increasing the scope include loop fusion, loop permutation, etc. To illustrate, with reference to FIG. 8, the function "f( )" is transformed by a compiler/scheduling transform into function "g( )". While this may create an overhead of re-computing the function "foo (i, j)" several times, the scope of the variable increased from 2 to 3. The array variable "A" can then be transformed into a scalar variable "SA," which can significantly (e.g., by one or more orders of magnitude, i.e., by ten times, hundred times, thousand times, a million times, or more) decrease the footprint of the variable "A."

In some embodiments where the expansion choice is limited to naive expansion, no expansion, or contractions, for e.g., because the computational complexity of these embodiments is less than that of more general methods, the costs are selected such that unless the footprint variable of an array can become zero minimization of the footprint variable to non-zero positive values is avoided. If the footprint variable becomes zero, the producer-consumer relationships on the array elements happen within the same iteration of the resulting loop dimension, in which case the array does not need expansion and may even be contracted along the resulting loop dimension. In this case, the resulting array size corresponds to the product of the number of iterations along the resulting loops for which the footprint variables are positive. In other embodiments, where more general expansion and compression techniques are available, the footprint variable(s) may be minimized to non-zero positive values, and the resulting footprint for an array can be approximated as the product of the footprint variables at all schedule dimensions.

Various embodiments described herein enable the pruning of the search of an optimized schedule, for instance by canceling a partial solution as soon as it is detected that one of the arrays will require more than a certain number of bytes, or alternatively that the sum of the array footprints is greater than a pre-specified threshold value. Thus, the systems and processes described herein can improve the operation of a computer programmed as a compiler because the improved compiler can explore performance and memory footprint trade-offs that are not explored by other compilers. Moreover, the systems and processors described herein can also improve the operation of a computing system executing the compiled program because the operations of the program may be scheduled to improve one or more of parallelism, locality, and data communication among memory hierarchies, while minimizing or avoiding footprint expansion.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for controlling scheduling of statements of a program for execution by a computing apparatus, the method comprising performing by a processor configured as a compiler the steps of:
   identifying a plurality of statements within a loop nest, the plurality of statements representing operations using a variable;
   determining an original scope of the variable within the loop nest, the original scope being a maximum depth of the loop nest at which all values produced and stored in the variable at a given iteration of the loop nest are also fully consumed by all consumers of the variable at the same iteration, the maximum depth not being greater than the depth at which one or more values are assigned to the variable; and
   setting a constraint corresponding to a memory footprint of the variable for a scheduler for scheduling the loop nest for execution by the computing apparatus, the constraint being based on, at least in part, the original scope.

2. The method of claim 1, wherein setting the constraint comprises:
   receiving from the scheduler a loop fission transform which distributes the loop nest into a first sub nest and a second sub nest;
   determining by the processor a new scope of the variable corresponding to the first and second loop nests;
   permitting the scheduler to perform the fission transform if the new scope is equal to the original scope; and
   otherwise configuring the scheduler to reject the loop fission transform.

3. The method of claim 1, wherein setting the constraint comprises:
   identifying a plurality of statements each representing an operation using the variable; and
   setting a dependence distance between all pairs of the plurality of statements to zero.

4. The method of claim 1, wherein setting the constraint comprises:
   setting a designated zero penalty for a base loop dimension that is equal to the original scope;
   for each of loop dimension from previous to the base loop dimension up to dimension of the outermost loop of the loop nest, setting a penalty that is greater than the designated zero penalty and that is a function of the loop dimension.

5. The method of claim 4, wherein the penalty comprises a cost, and the scheduler rejects any transform if cost of the transform is greater than the cost.

6. The method of claim 5, wherein:
   setting the designated zero penalty comprises setting the cost to zero; and
   setting the penalty that is a function of the loop dimension comprises setting a cost value that increases as the loop dimension decreases.

7. The method of claim 4, wherein:
   the penalty comprises a permissible dependence distance between a pair of statements, each statement representing an operation using the variable;
   setting the designated zero penalty comprises setting the permissible dependence distance to a maximum permissible distance; and
   setting the penalty that is a function of the loop dimension comprises setting a permissible dependence distance that decreases as the loop dimension decreases.

8. The method of claim 7, further comprising computing by the processor the maximum dependence distance.

9. The method of claim 1, wherein setting the constraint comprises:
   computing for each one of a plurality of statement pairs, each statement in each pair representing an operation using the variable, a respective plurality of dependence distances;
   determining a maximum of the plurality of dependence distances; and
   associating a cost proportional to the maximum dependence distance.

10. The method of claim 9, wherein the cost further corresponds to a number of iterations associated with the variable for a loop dimension to be scheduled.

11. The method of claim 9, further comprising configuring the scheduler to minimize the maximum dependence distance.

12. The method of claim 11, further comprising increasing the original scope of the variable by transforming the loop nest.

13. A system for controlling scheduling of statements of a program for execution by a computing apparatus, the system comprising:
   a first processor; and
   a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
   identify a plurality of statements within a loop nest, the plurality of statements representing operations using a variable;
   determine an original scope of the variable within the loop nest, the original scope being a maximum depth of the loop nest at which all values produced and stored in the variable at a given iteration of the loop nest are also fully consumed by all consumers of the variable at the same iteration, the maximum depth not being greater than the depth at which one or more values are assigned to the variable;

set a constraint corresponding to a memory footprint of the variable for a scheduler for scheduling the loop nest for execution by the computing apparatus, the constraint being determined based on, at least in part, the original scope.

14. The system of claim 13, wherein to set the constraint the instructions further program the processing unit to:

receive from the scheduler a loop fission transform which distributes the loop nest into a first sub nest and a second sub nest;

determine a new scope of the variable corresponding to the first and second loop nests;

permit the scheduler to perform the fission transform if the new scope is equal to the original scope; and otherwise configure the scheduler to reject the loop fission transform.

15. The system of claim 13, wherein to set the constraint the instructions further program the processing unit to:

identify a plurality of statements each representing an operation using the variable; and set a dependence distance between all pairs of the plurality of statements to zero.

16. The system of claim 13, wherein to set the constraint the instructions further program the processing unit to:

set a designated zero penalty for a base loop dimension that is equal to the original scope;

for each of loop dimension from previous to the base loop dimension up to dimension of the outermost loop of the loop nest, set a penalty that is greater than the designated zero penalty and that is a function of the loop dimension.

17. The system of claim 16, wherein the penalty comprises a cost, and the scheduler rejects any transform if cost of the transform is greater than the cost.

18. The system of claim 17, wherein:

for setting the designated zero penalty, the instructions further program the processing unit to set the cost to zero; and for setting the penalty that is a function of the loop dimension the instructions further program the processing unit to set a cost value that increases as the loop dimension decreases.

19. The system of claim 16, wherein:

the penalty comprises a permissible dependence distance between a pair of statements, each statement representing an operation using the variable;

for setting the designated zero penalty the instructions further program the processing unit to set the permissible dependence distance to a maximum permissible distance; and for setting the penalty that is a function of the loop dimension the instructions further program the processing unit to set a permissible dependence distance that decreases as the loop dimension decreases.

20. The system of claim 19, wherein the instructions further program the processing unit to compute the maximum dependence distance.

21. The system of claim 13, wherein for setting the constraint the instructions further program the processing unit to:

compute for each one of a plurality of statement pairs, each statement in each pair representing an operation using the variable, a respective plurality of dependence distances;

determine a maximum of the plurality of dependence distances; and associate a cost proportional to the maximum dependence distance.

22. The system of claim 21, wherein the cost further corresponds to a number of iterations associated with the variable for a loop dimension to be scheduled.

23. The system of claim 21, wherein the instructions further program the processing unit to configure the scheduler to minimize the maximum dependence distance.

24. The system of claim 23, wherein the instructions further program the processing unit to increase the original scope of the variable by transforming the loop nest.

25. An article of manufacture comprising a non-transitory storage medium having stored therein instructions which, when executed by a processing unit program the processing unit in electronic communication with a memory module, for controlling scheduling of statements of a program for execution by a computing apparatus, to:

identify a plurality of statements within a loop nest, the plurality of statements representing operations using a variable;

determine an original scope of the variable within the loop nest, the original scope being a maximum depth of the loop nest at which all values produced and stored in the variable at a given iteration of the loop nest are also fully consumed by all consumers of the variable at the same iteration, the maximum depth not being greater than the depth at which one or more values are assigned to the variable;

set a constraint corresponding to a memory footprint of the variable for a scheduler for scheduling the loop nest for execution by the computing apparatus, the constraint being based on, at least in part, the original scope.

26. The article of manufacture of claim 25, wherein to set the constraint the instructions further program the processing unit to:

receive from the scheduler a loop fission transform which distributes the loop nest into a first sub nest and a second sub nest;

determine a new scope of the variable corresponding to the first and second loop nests;

permit the scheduler to perform the fission transform if the new scope is equal to the original scope; and otherwise configure the scheduler to reject the loop fission transform.

27. The article of manufacture of claim 25, wherein to set the constraint the instructions further program the processing unit to:

identify a plurality of statements each representing an operation using the variable; and set a dependence distance between all pairs of the plurality of statements to zero.

28. The article of manufacture of claim 25, wherein to set the constraint the instructions further program the processing unit to:

set a designated zero penalty for a base loop dimension that is equal to the original scope;

for each of loop dimension from previous to the base loop dimension up to dimension of the outermost loop of the loop nest, set a penalty that is greater than the designated zero penalty and that is a function of the loop dimension.

29. The article of manufacture of claim 28, wherein the penalty comprises a cost, and the scheduler rejects any transform if cost of the transform is greater than the cost.

30. The article of manufacture of claim 29, wherein:
for setting the designated zero penalty, the instructions further program the processing unit to set the cost to zero; and
for setting the penalty that is a function of the loop dimension the instructions further program the processing unit to set a cost value that increases as the loop dimension decreases.

31. The article of manufacture of claim 28, wherein:
the penalty comprises a permissible dependence distance between a pair of statements, each statement representing an operation using the variable;
for setting the designated zero penalty the instructions further program the processing unit to set the permissible dependence distance to a maximum permissible distance; and
for setting the penalty that is a function of the loop dimension the instructions further program the processing unit to set a permissible dependence distance that decreases as the loop dimension decreases.

32. The article of manufacture of claim 31, wherein the instructions further program the processing unit to compute the maximum dependence distance.

33. The article of manufacture of claim 25, wherein for setting the constraint the instructions further program the processing unit to:
compute for each one of a plurality of statement pairs, each statement in each pair representing an operation using the variable, a respective plurality of dependence distances;
determine a maximum of the plurality of dependence distances; and
associate a cost proportional to the maximum dependence distance.

34. The article of manufacture of claim 33, wherein the cost further corresponds to a number of iterations associated with the variable for a loop dimension to be scheduled.

35. The article of manufacture of claim 33, wherein the instructions further program the processing unit to configure the scheduler to minimize the maximum dependence distance.

36. The article of manufacture of claim 35, wherein the instructions further program the processing unit to increase the original scope of the variable by transforming the loop nest.

* * * * *